(12) United States Patent
Yoshinaga et al.

(10) Patent No.: US 6,914,537 B2
(45) Date of Patent: Jul. 5, 2005

(54) METHOD FOR MONITORING OPERATION DATA OF AN INJECTION-MOLDING MACHINE

(75) Inventors: Akira Yoshinaga, Numazu (JP);
Makoto Nishizawa, Numazu (JP);
Fumiyuki Kato, Shizuoka-ken (JP);
Jun Koike, Shizuoka-ken (JP); Hiroshi Katsuta, Gotemba (JP)

(73) Assignee: Toshiba Machine Co., Ltd., Tokyo (JP)

( * ) Notice: Subject to any disclaimer, the term of this patent is extended or adjusted under 35 U.S.C. 154(b) by 0 days.

(21) Appl. No.: 10/151,247

(22) Filed: May 21, 2002

(65) Prior Publication Data

US 2002/0177921 A1 Nov. 28, 2002

(30) Foreign Application Priority Data

May 25, 2001 (JP) ........................................ 2001-157259

(51) Int. Cl.$^7$ .............................................. G08B 21/00
(52) U.S. Cl. .................. 340/679; 340/680; 340/825.22; 340/825.23; 264/40.1; 264/40.5; 264/40.6; 264/135
(58) Field of Search .............................. 340/679, 680, 340/686.1, 686.5, 825.22, 825.23, 3.1; 264/40.1, 40.5, 40.6, 328.1, 405; 425/135, 136, 149, 143; 700/200

(56) References Cited

U.S. PATENT DOCUMENTS

| 4,911,629 A | 3/1990 | Fujita .......................... 425/135 |
| 5,062,784 A | 11/1991 | Inaba et al. .................. 425/143 |
| 5,173,223 A | 12/1992 | Kamiguchi et al. ......... 264/40.1 |
| 5,225,122 A | 7/1993 | Inaba et al. ................. 264/40.1 |
| 5,238,380 A * | 8/1993 | Wenskus, Jr. et al. ...... 425/145 |
| 5,283,018 A * | 2/1994 | Inaba et al. ................. 264/40.1 |
| 5,316,707 A * | 5/1994 | Stanciu et al. .............. 264/40.1 |
| 6,517,754 B1 | 2/2003 | Hehl .......................... 264/40.1 |
| 6,529,835 B1 * | 3/2003 | Wada et al. .................. 702/21 |

FOREIGN PATENT DOCUMENTS

| DE | 68915761 T2 | 8/1990 |
| DE | 4434654 A1 | 4/1996 |
| DE | 19514535 A1 | 10/1996 |
| DE | 19834797 C2 | 2/2000 |
| JP | 10-323874 | 12/1998 |
| JP | 11-010693 | 1/1999 |
| JP | 11-010694 | 1/1999 |

\* cited by examiner

*Primary Examiner*—Hung Nguyen
(74) *Attorney, Agent, or Firm*—Pillsbury Winthrop Shaw Pittman, LLP

(57) ABSTRACT

The present invention is directed to a method of monitoring operation data for quality control with a little possibility that a nondefective product is mistakenly determined as a defective product even if the operation data fluctuates in a large waviness curve. Every time an operation data piece for quality control is obtained, a moving average of the predetermined number of data pieces lately obtained is calculated. When the deviation of a data piece from the moving average exceeds the tolerance limit, an alarm is generated. By employing the method of the present invention for monitoring operation data such as charging time, injection time and the amount of cushion in an injection-molding machine, the accuracy of determination as to a defective or nondefective can be improved.

2 Claims, 2 Drawing Sheets

METHOD FOR MONITORING OPERATION DATA OF AN INJECTION-MOLDING MACHINE

CROSS-REFERENCE TO RELATED APPLICATIONS

This application is based upon and claims the benefit of priority from the prior Japanese Patent Application No. 2001-157259, filed May 25, 2001, the entire contents of which are incorporated herein by reference.

BACKGROUND OF THE INVENTION

1. Field of the Invention

The present invention relates to a method for monitoring operation data of an injection-molding machine for quality control.

2. Description of the Related Art

FIG. 2 shows a schematic structure of the injection unit of a hydraulic injection-molding machine. In the figure, reference numeral 1 denotes a mold, 3 a heating barrel, 5 a screw, and 7 a hydraulic cylinder.

The heating barrel 3 is connected to the back surface of the mold 1 via a nozzle 4 arranged at the tip (left end). The screw 5 is installed within the heating barrel 3. The hydraulic cylinder 7 for injection is connected to the rear end portion of the screw 5. A hopper 6 is connected to the portion close to the rear end of the heating barrel 3.

In a charging step, the screw 5 is rotated in the forward direction within the heating barrel 3 by a servomotor (not shown) for charging to introduce resin into the heating barrel 3 from the hopper 6. The introduced resin is heated to melt with agitation, fed toward the front portion (leftward in the figure) of the screw 5, and accumulated in the front portion of the heating barrel 3. Accordingly, the screw 5 is moved backward by the pressure of the accumulated molten resin. After a predetermined amount of the molten resin is accumulated in the heating barrel 3, the screw 5 is moved forward by the hydraulic cylinder 7. In this manner, the molten resin is injected into the mold 1.

Conventionally, the operation data of an injection-molding machine for quality control is monitored in the method described below. First, a reference value and a tolerance limit of the deviation from the reference value are determined with respect to the operation data (such as charging time, injection time, the amount of cushion, charging pressure, injection pressure, and peak pressure). Every time operation data is actually obtained, the deviation of the operation data from the reference value is calculated. When the value of the deviation exceeds the tolerance limit, an alarm is generated to inform the operator that a product may be defective.

The charging time used herein refers to time required for charging a predetermined amount of molten resin into the heating barrel 3. The injection time refers to time from the initiation of injection of the molten resin (from the heating barrel 3 to the mold 1) up to the initiation of a pressure-holding step. The amount of cushion is the forward-moving distance of the screw 5 (or plunger) in the heating barrel 3 during the pressure-holding step. In the pressure holding step, the molten resin is replenished into the mold 1 by moving the screw 5 forward in the heating barrel 3, to make up the room formed by the shrinkage caused by solidification of the resin. The charging pressure is the internal pressure of the heating barrel 3 when the molten resin is charged or the backpressure of the screw 5 (namely, the pressure of the hydraulic cylinder 7) at that time. The injection pressure refers to the internal pressure of the heating barrel 3 when the molten resin is injected from the injection unit into the mold 1 or the backpressure of the screw 5 at that time. The peak pressure is the maximum instantaneous value of the injection pressure during a single injection operation.

The reference value and the tolerance limit of the deviation are fixed. Once they are set, they are maintained at the same value until the operator changes the values.

The reference values are conventionally set in the following manners.

(a) The operator directly inputs a reference value on a set-up screen of an operation board. This method can be employed when the same product as manufactured in the past is to be manufactured and the reference value previously obtained can be applied.

(b) A trial operation is repeatedly performed until nondefective products are stably obtained. At this time, an average value (or the latest value) of the data pieces obtained through the trial operations is set as a reference value. This method can be employed when an appropriate number of products are formed after operation conditions are roughly determined, and then, the reference value is determined while evaluating whether these conditions are proper or not.

The tolerance limit of the deviation is conventionally determined in the following method.

(a) The operator directly inputs a tolerance limit on a set-up screen of an operation board. This method can be employed when the same product as manufactured in the past is to be manufactured and the tolerance limit previously obtained can be applied.

(b) When a recommended value by the device manufacture for the tolerance limit of the deviation has been stored in the operation board (e.g., memory device) in advance, the operator presses a push button to read out the recommended value and set as the tolerance limit of the deviation on the operation board.

The recommended value is stored in the operation board in the following two states.

(b-1) Case where the recommended value is stored as a variable parameter:

The recommended value is stored as a variable parameter in the operation board but not encoded as a fixed value within the control program. In this case, it is generally impossible for the operator to freely modify the recommended value as a variable parameter. However, the service technician of the device manufacturer can modify the recommended value by using a parameter-setting mode without changing the control program.

(b-2) Case where the recommended value is encoded as a fixed value in the control program The recommended value cannot be changed without changing the control program. Therefore, it is impossible for the operator to change the recommended value. It is not easy even for the service technician of the device manufacturer to change the control program.

PROBLEM ASSOCIATED WITH THE PRIOR ART

When the quality-control operation data is monitored in an injection-molding machine, it is desirable to detect sudden malfunction and determine the product as defective only if such malfunction is observed. However, the operation data varies when the temperatures of the mold or the injection unit are fluctuated in a waviness curve by the effects of the outside air temperature or cooling water temperature. To describe more specifically, when the temperature of the mold increases, the flowability of the resin within the mold increases. As a result, a larger amount of resin is injected into the mold and the amount of cushion increases. Alternatively, when the temperature of the injection unit increases, the melting of a crystalline resin facilitated, shortening the charging time. In the case of an amorphous resin, melting is also facilitated. Melting starts from a feed zone, which is a portion near the connection part of the hopper 6 within the heating barrel 3 (FIG. 2). As a result, the friction force between the screw and the resin decreases, weakening the force for feeding out the resin. In this way, the charging time tends to increase.

As explained above, even when the operation data fluctuates and deviates from a predetermined tolerance limit by the effect of disturbance factors upon the operation data, the obtained product is determined as defective. However, some of the products determined as defective actually satisfy the requirements for d nondefective product. In other words, there are some cases where a nondefective product is determined as defective. Especially, when the operation data shows a steady increase and decrease or fluctuation of large waviness curve, if the monitoring of the operation data is performed based on the fixed reference value, there are some possibilities that a nondefective product is determined as being defective from the operation data.

BRIEF SUMMARY OF THE INVENTION

The present invention has been achieved in consideration of the aforementioned problems associated with conventional monitoring methods for operation data for quality control in an injection-molding machine. An object of the present invention is to provide a monitoring method that reduces a possibility of mistakenly determining a nondefective product as being defective even in the case where operation data for quality control fluctuates in a large waviness curve.

A method of monitoring operation data of an injection-molding machine for quality control comprising:

calculating a moving average of a predetermined number of the latest data pieces every time an operation data piece for quality control is obtained; and generating an alarm when a deviation of the operation data from the moving average exceeds a predetermined tolerance limit.

Preferably, when the data of the product is determined as defective, the data is eliminated before the moving average is calculated.

The injection-molding machine of the present invention comprises a monitoring unit for monitoring operation data for quality control in accordance with the aforementioned method.

According to the monitoring method of the present invention, whether a defective product or nondefective product is determined based on the deviation of the data piece actually measured from the latest moving average. By virtue of this feature, the changes of environmental conditions over a relatively long period do not affect the determination. Therefore, only when a sudden malfunction of the injection-molding machine happens, the product influenced by the malfunction is determined as being defective. According to the monitoring method of the present invention, the possibility that a nondefective product is determined as defective can be reduced. Hence, the yield of nondefective products can be increased, decreasing the manufacturing cost. In addition, the product determined as defective based on the operation data needs not to be inspected afterward. Therefore, the productivity can be improved.

In the injection-molding machine, by using the method of the present invention to monitor the operation data, such as charging time, injection time, and an amount of cushion, the accuracy of defective or nondefective determination can be improved. The term "charging time" refers to time required for charging a predetermined amount of raw material resin into the heating barrel. The term "injection time" refers to time from the initiation of injection of molten resin into a mold from the heating barrel to the initiation of a pressure holding step. The term "the amount of cushion" refers to the forward-moving distance of a screw according to the shrinkage of the resin in the mold during the pressure holding step.

DETAILED DESCRIPTION OF THE INVENTION

Figure 1:
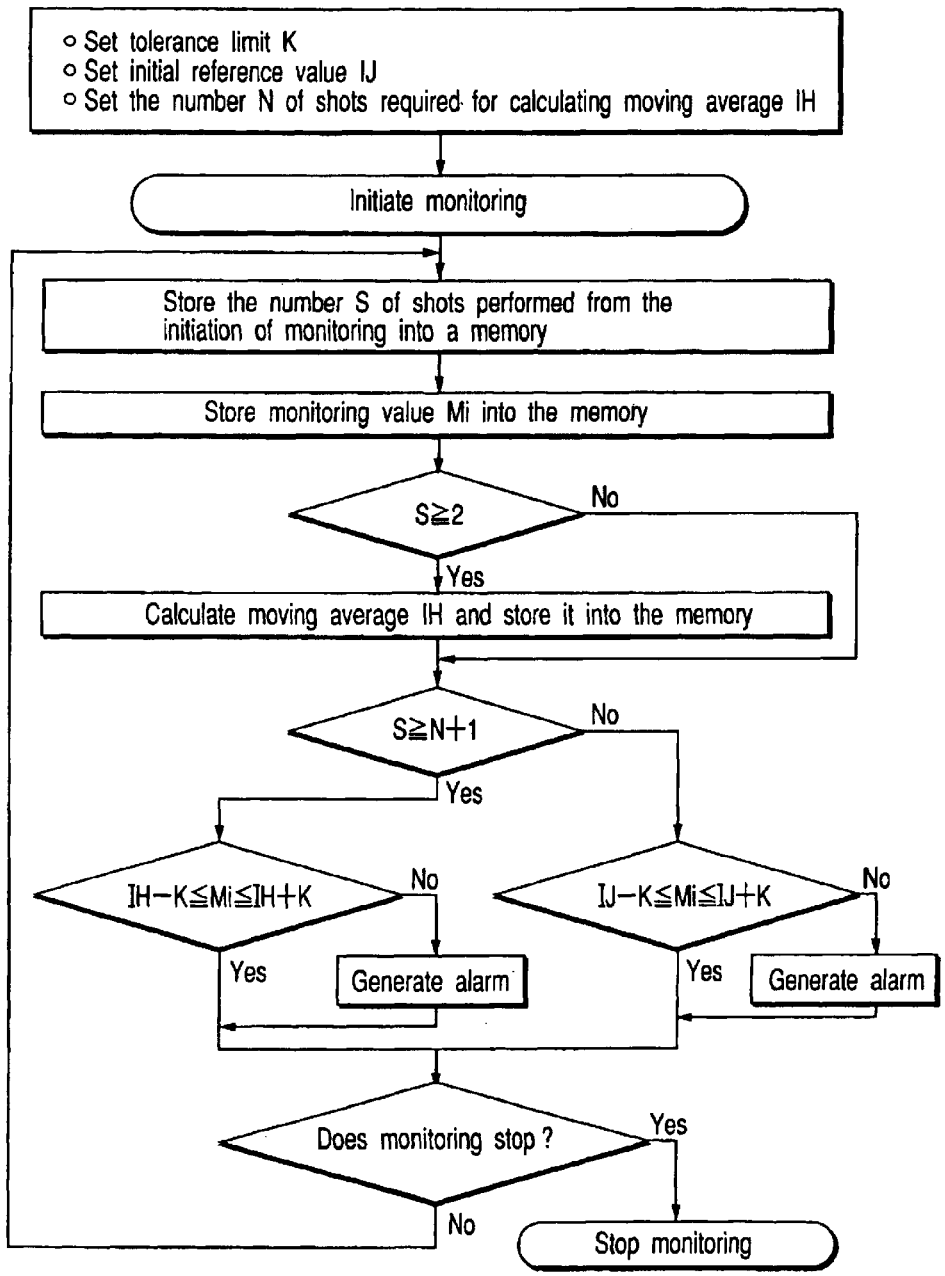
FIG. 1 is a flowchart showing a method of monitoring an injection-molding machine according to the present invention.
Figure 2:
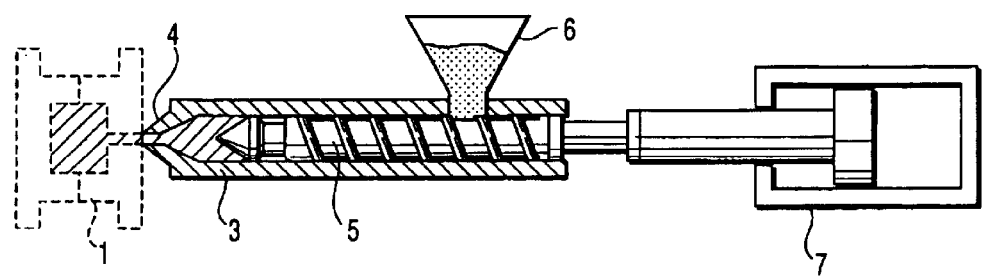
FIG. 2 is a schematic structure of an injection unit portion of a hydraulic injection-molding machine to which the monitoring method of the present invention is to be applied.

FIG. 1 is a flowchart of a monitoring method of an injection-molding machine based on the present invention.

At the outset, with respect to operation data for the quality control (such as charging time, injection time, and the amount of cushion), a tolerance limit K of the deviation from a reference value is determined. When the difference of actually obtained data from the reference value exceeds the tolerance limit K, the product is determined as being defective.

An initial reference value IJ is determined. This is because no data pieces are present for obtaining a moving average IH at the time a production is initiated. As the initial reference IJ, a reference value determined in trial operations or a reference value obtained from data of operations previously performed may be used.

The number of data pieces for obtaining the value of the moving average IH is determined. In this case, the injection number N for injection operation is determined.

The operation of the injection-molding machine is started. At the same time, the monitoring of the operation data is started.

Up to N injections from the initiation of the operation, the moving average IH, which is obtained from the latest N injections, has not been obtained. Therefore, the deviation of actual data piece Mi from the initial reference value IJ is monitored. When the absolute value of the deviation exceeds the tolerance limit K, a product is determined as being defective, and then, an alarm is generated.

On and after N+1 injections, the moving average IH of the latest N shots injections is used as a reference value. The deviation of actual data piece Mi from the moving average IH is monitored. When the absolute value of the deviation exceeds the tolerance limit K, the product is determined as being defective, and then, an alarm is generated.

MODIFIED MONITORING METHOD

The monitoring method of the present invention is not limited to the method shown in FIG. 1 and may be modified in various ways as shown below.

a. The tolerance limit of the deviation may be set as follows. The value of the plus side of the moving average may differ from that of the minus side. Furthermore, the tolerance limit may be set at one of the sides. In this case, if the deviation values of products fall in the other side, all products are determined as being nondefective.

b. Immediately after the operation is started, the reference value may be set as follows. From the second injection to N-th injection, a moving average is obtained from actual data pieces (N minus 1) so far obtained. Otherwise, if the number of actual data pieces is insufficient, the initial reference value IJ may be used in place of the actual data to obtain a moving average.

c. The determination of a defective or nondefective product may be started from the "N+1" th injection without setting the initial reference value IJ. Furthermore, according to the method of b, the determination may be performed on and after the second injection.

d. A moving average is calculated after eliminating data of the product determined as defective.

e. In the flowchart shown in FIG. 1, an alarm is simply generated when a product is determined as defective. However, the injection-molding machine may be stopped when a product is determined as defective. Alternatively, if a predetermined number of alarms are continuously generated, the operation of the injection-molding machine may be stopped.

According to the monitoring method of the present invention, the possibility of mistakenly determining a nondefective product as being defective can be reduced. Therefore, it is possible to increase the yield of nondefective products and thereby reduce the manufacturing cost. In addition, the labor is reduced since the step of inspecting products determined as being defective based on the operation data can be eliminated. As a result, the productivity is improved.

What is claimed is:

1. A method of monitoring operation data of an injection molding machine for quality control, comprising:

setting an initial reference value of data points of operation;

after a predetermined number of injections, calculating a moving average of the predetermined number of data points of operation data for quality control;

generating an alarm when a deviation of the operation data from the moving average exceeds a predetermined tolerance limit;

after the predetermined number of injections, replacing the initial reference value with the moving average; and prior to replacing the initial reference value, generating an alarm when a deviation of the operation data from the initial reference value exceeds a predetermined tolerance limit.

2. A method according to claim 1, further comprising stopping the injection molding machine if a predetermined number of alarms are generated.

* * * * *